(12) United States Patent
Lecomte

(10) Patent No.: US 7,581,635 B2
(45) Date of Patent: Sep. 1, 2009

(54) METHOD AND INSTALLATION FOR CHANGING THE PITCH OF DISCRETE ENTITIES CONVEYED IN SUCCESSION

(75) Inventor: Frederic Lecomte, Octeville sur Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 0 days.

(21) Appl. No.: 11/875,030

(22) Filed: Oct. 19, 2007

(65) Prior Publication Data
US 2008/0093198 A1   Apr. 24, 2008

(30) Foreign Application Priority Data
Oct. 20, 2006   (FR)   ................... 06 09252

(51) Int. Cl.
  *B65G 47/28*   (2006.01)
(52) U.S. Cl. ............... 198/459.4; 198/459.2; 198/474.1
(58) Field of Classification Search ............. 198/470.1, 198/474.1, 478.1, 459.2, 459.3, 459.4
  See application file for complete search history.

(56) References Cited

U.S. PATENT DOCUMENTS

| | | | | |
|---|---|---|---|---|
| 2,007,981 A | * | 7/1935 | Nordquist ................ | 198/459.2 |
| 4,506,779 A | * | 3/1985 | Seragnoli ................. | 198/459.1 |
| 4,660,708 A | * | 4/1987 | Willerding ............... | 198/459.4 |
| 4,753,275 A | * | 6/1988 | Schaltegger ............. | 198/474.1 |
| 4,925,001 A | * | 5/1990 | Mollenkamp ............ | 198/459.4 |
| 5,477,956 A | * | 12/1995 | Liebhart .................. | 198/459.4 |
| 6,736,257 B2 | * | 5/2004 | Steiniger et al. ......... | 198/461.1 |
| 7,311,515 B2 | * | 12/2007 | Netsu ...................... | 198/474.1 |

FOREIGN PATENT DOCUMENTS

| | | |
|---|---|---|
| DE | 35 29 716 A1 | 3/1987 |
| FR | 2 496 065 A1 | 6/1982 |
| JP | 57-121521 A | 7/1982 |

* cited by examiner

*Primary Examiner*—James R Bidwell
(74) *Attorney, Agent, or Firm*—Sughrue Mion, PLLC

(57) ABSTRACT

Method for changing the pitch between discrete entities conveyed in succession between a device for feeding the entities at an initial spacing pitch provided between two entities fed in succession and a device for receiving the entities at a final pitch substantially greater than the initial pitch. The method including transporting the discrete entities by a variable pitch feed screw device configured to receive the entities downstream of the device for feeding the entities, the screw including a groove in which the entities are capable of being housed and displaced, so that the pitch between two entities received by the screw is increased downstream of the screw as far as an intermediate pitch; and transferring and gripping the entities at the intermediate pitch by a wheel for changing the pitch, configured to transfer the entities into the receiving device at the final pitch.

9 Claims, 8 Drawing Sheets

METHOD AND INSTALLATION FOR CHANGING THE PITCH OF DISCRETE ENTITIES CONVEYED IN SUCCESSION

TECHNICAL FIELD

The subject of the present invention is a method for changing the pitch between discrete entities conveyed in succession between a device for feeding said entities at an initial spacing pitch provided between two entities fed in succession and a device for receiving said entities at a final pitch substantially greater than the initial pitch.

BACKGROUND OF THE INVENTION

In installations for treating containers such as bottles, it may be necessary to modify the spacing pitch of successive containers during the passage from one treatment station to a subsequent treatment station. This may be the case, for example, for feeding a treatment station with containers or bottles having to undergo a plasma treatment which makes it possible to achieve the formation of an internal coating in the containers or bottles. It is, therefore, necessary to provide a system for conveying discrete entities allowing the discrete entities to be transferred from the feed device to the treatment station whilst increasing the pitch or the spacing between two successive or immediately adjacent entities so that the two immediately adjacent entities are fed to the treatment station at the pitch corresponding to the spacing pitch of two immediately adjacent treatment stations.

It is known to use a system with a variable pitch feed screw, capable of pivoting on itself and allowing the pitch to be increased between two successively fed containers.

An example of such an embodiment of a variable pitch feed screw is shown according to a side view in FIG. 1, FIGS. 2 and 3 respectively illustrating said variable pitch feed screw according to a side schematic view and a transverse schematic sectional view.

Means for feeding discrete entities, of the container or bottle 2 type, are provided upstream of the variable pitch feed screw 1, each container body 2 being capable of being engaged in the region of the upstream end 1a of the screw 1 in a groove or slot 3 formed on the circumference of the screw 1, the pitch of the slot 3 increasing between the upstream end 1a and the downstream end 1b of the feed screw 1. The bottom of each container 2 thus bears against an endless belt conveyor 4. In order to maintain the bottle or container 2 in the slot 3 and in the position bearing against the endless belt conveyor 4, a plurality of fixed guides 5, 6, 7, preferably in the form of rails, is provided. Two fixed guides 5, 6 are advantageously provided and shaped so that the side of the body of the bottle or the container 2 which opposes the side of the container or the bottle 2 housed in the slot 3 of the feed screw 1, is capable of sliding on these two fixed guides 5, 6. Additionally, a third fixed guide 7 is also provided, capable of being engaged beneath an annular projection or flange 8 either of the bottle or of the container 2.

If it is desired to increase the pitch between two containers fed successively on a variable pitch screw, it is necessary, therefore, to increase the length of the feed screw as the pitch between the articles is always substantially the same at the inlet of the screw due to the fact that the containers are against one another. From now on, only the diameter of the container influences this inlet pitch whilst at the outlet of the screw, the pitch depends on what is desired to be achieved. In other words, the pitch of the screw at the outlet dictates the length thereof. As a result, the container is accelerated from its inlet velocity to its outlet velocity, producing forces on the container which may be squashed and marked. Thus, to avoid this occurrence, the length of the transition from one pitch to another is exploited and so is the total length of the screw. However, this length poses the problem of its flexibility, vibrations, and of the difficulty of handling a screw of great length when changing the size of container. As a result, the use of screws of great length proves to be unacceptable in current practice.

Moreover, in order to press down the containers or bottles properly into the slot 3 of the feed screw 1, the endless belt conveyor 4 runs at a velocity greater than the velocity of the bottle in the feed screw 1. In this manner, the container 2 is held upright in the slot 3 and is stabilized. Nevertheless, the greater the pitch at the outlet of the screw, the greater the velocity of the conveyor 4 has to be.

It should also be pointed out that the transport of containers by means of a variable pitch feed screw is liable to leave scratch marks on the body of the container thus transported, this risk being all the greater, the greater the pitch and thus the greater the angle.

Moreover, as a result of the size of such an endless screw, it would also be difficult to incorporate such a screw in an installation where it is desired to limit the overall spatial requirement.

It is also necessary to consider that a feed screw of great length is heavy and not easy to handle. It would thus be difficult to replace such a feed screw of great length easily and by using just one person.

Moreover, it should also be noted that a screw of great length is more difficult to control.

For certain applications, for example for loading containers in stations for depositing a barrier coating by means of plasma excited by electromagnetic waves, a much greater extension of the pitch is required, which is able to reach, for example, $72\pi$.

All the above considerations tend to limit the implementation of feed screw devices with variations in pitch not exceeding a certain limit. To sum up, the variation of pitch between containers for feeding machines such as filling machines or labelling machines is limited to values in the order of $25\pi$ to $30\pi$.

The object of the invention is, therefore, to propose means (a method and device) making it possible to increase the pitch between entities fed in succession whilst limiting the total spatial requirement of such a system and facilitating the operations of replacement and maintenance.

SUMMARY OF THE INVENTION

According to a first aspect thereof, the present invention relates to a method for changing the pitch between discrete entities conveyed in succession between a device for feeding said entities at an initial spacing pitch provided between two entities fed in succession and a device for receiving said entities at a final pitch substantially greater than the initial pitch, wherein the method comprises a step of transporting the discrete entities by a variable pitch feed screw device capable of receiving said entities downstream of said device for feeding said entities, said screw comprising a groove in which said entities are capable of being housed and displaced, so that the pitch between two entities received by said screw is increased downstream of said screw as far as an intermediate pitch; and a step of transferring and gripping the entities at an intermediate pitch by a wheel for changing the pitch, capable of transferring said entities into said receiving device at said final pitch.

According to a second aspect thereof, the present invention also relates to an installation for changing the pitch between discrete entities conveyed in succession between a device for feeding entities at an initial spacing pitch provided between two entities fed in succession and a device for receiving said entities at a final pitch substantially greater than the initial pitch, for the implementation of the method as indicated above, wherein the installation comprises a feed screw device with a variable pitch between said initial pitch and an intermediate pitch capable of receiving in a peripheral groove said entities downstream of said feed device, in which said entities are at least partially housed; and a wheel for changing the pitch capable of gripping, by means of transfer arms, the entities gripped at the intermediate pitch, and transferring said entities into receiving stations of the receiving device at the final pitch.

In order to stabilize the containers at the outlet of the feed screw device, the installation according to the invention comprises a transfer wheel comprising a plurality of transfer arms capable of gripping, at the intermediate pitch, the entities in the region of the end downstream of the feed screw.

According to an advantageous embodiment, the transfer arms of the transfer wheel and the wheel for changing the pitch each comprise a gripping head in the form of a gripping clamp with two arms, with cam-controlled opening.

In order to facilitate the replacement of the transfer arms and the maintenance operations, the transfer wheel and the wheel for changing the pitch comprise a rotating support plate on which the transfer arms are fixed by removable fixing means.

Advantageously, the removable fixing means comprise a screw nut assembly.

In order to facilitate the replacement of a transfer arm by another, in particular in the case of modifying the structural characteristics of the entities conveyed, the screw is capable of being inserted into a tab incorporated in the transfer arm.

BRIEF DESCRIPTION OF THE DRAWINGS

The present invention is now disclosed using an example which is solely illustrative and in no way limits the scope of the invention, and by means of the following drawings, in which.

DESCRIPTION OF THE PREFERRED EMBODIMENT OF THE INVENTION

In the remainder of the description, the terms entity, container and bottle will be used interchangeably.

Figure 4:
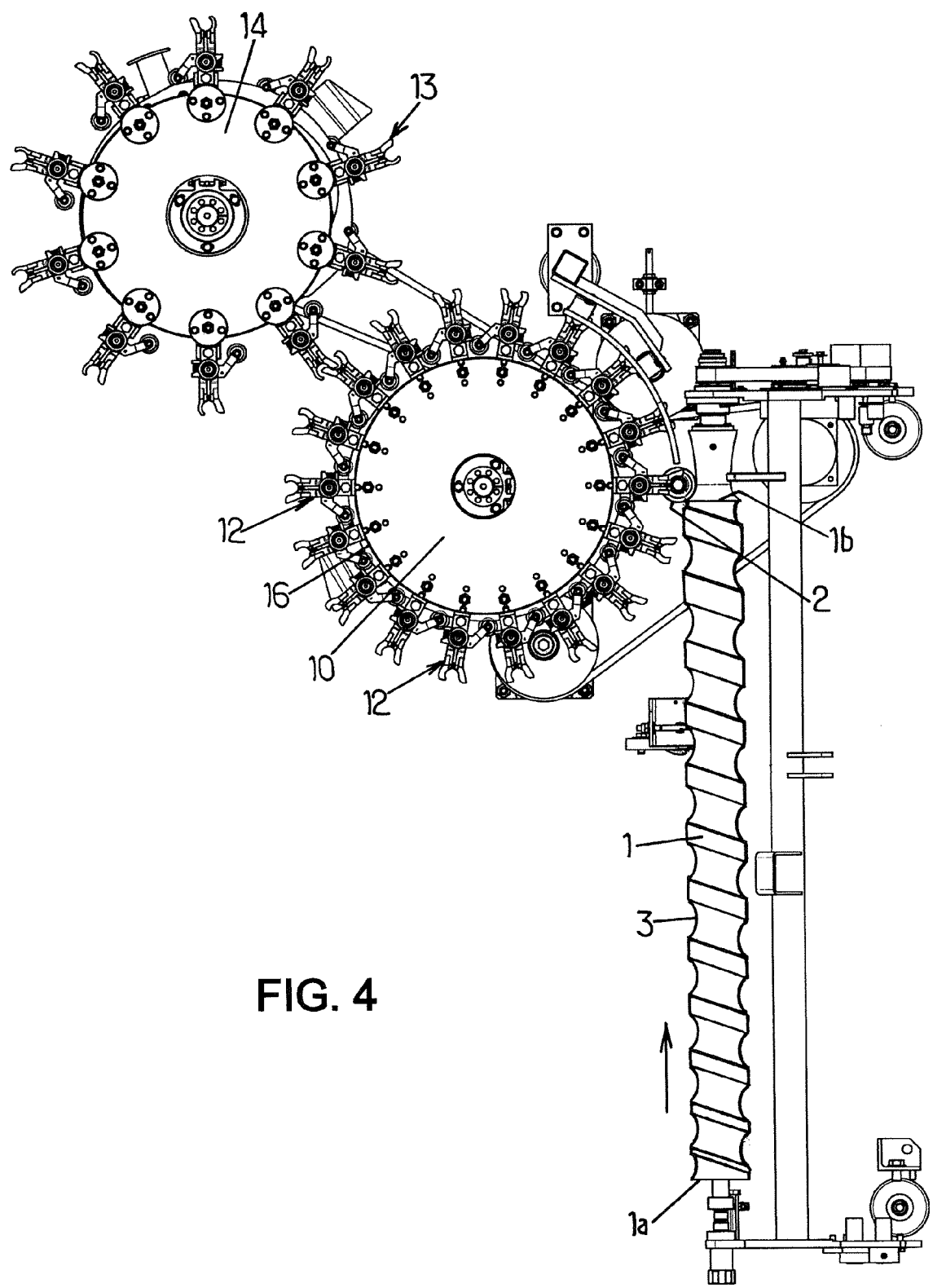
FIG. 4 is a schematic upper view of the installation for changing the pitch according to the invention.

FIG. 4 shows an upper view of the installation for changing the pitch of discrete entities conveyed in succession, and more preferably of the container or bottle 2 type, between a feed device not shown in the figures but of the type known per se, for discrete entities 2 and a device for receiving discrete entities 2.

The receiving device is, preferably, a station for treating containers 2, comprising a plurality of receiving stations for the treatment of containers 2, in particular for plasma treatment by electromagnetic excitation of the containers in order to deposit thereon an internal coating, distributed uniformly on the periphery of a rotating carousel about an axis of rotation.

Figure 1:
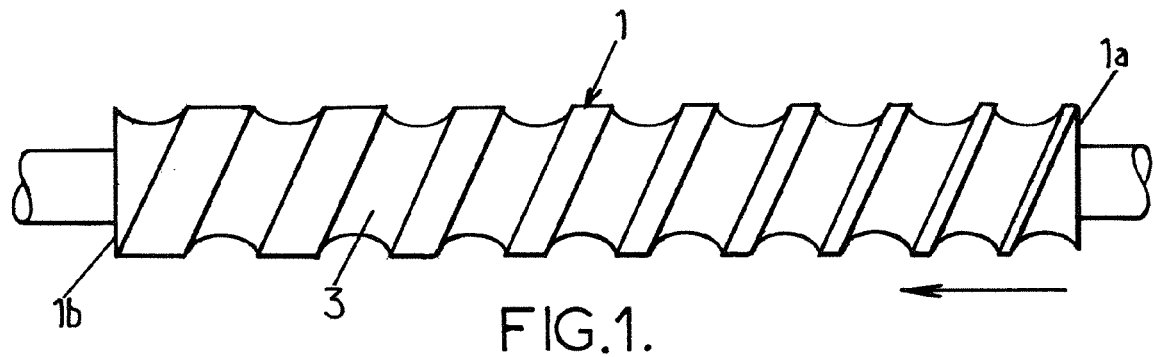
FIG. 1 is a side view of a variable pitch feed screw according to the prior art.
Figure 2:
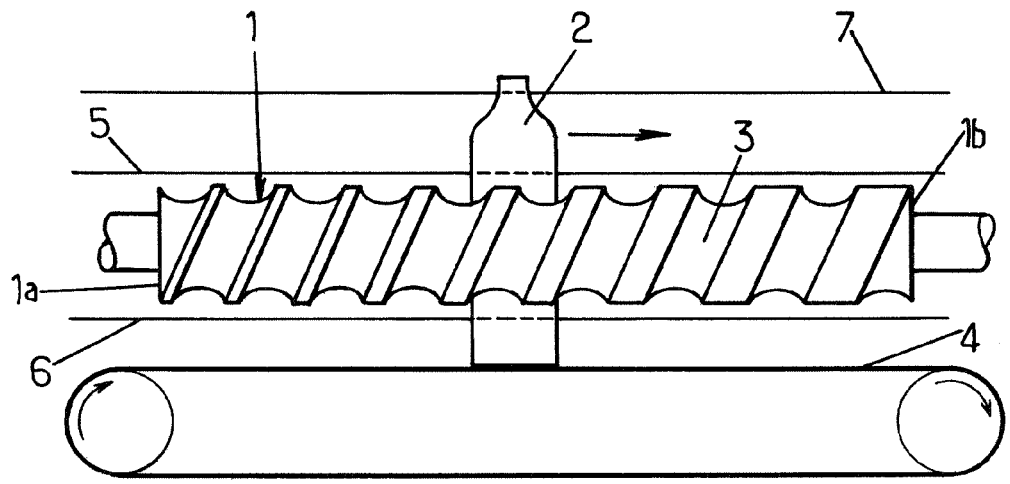
FIG. 2 is a side schematic view of a feed screw device for changing the pitch according to the prior art.
Figure 3:
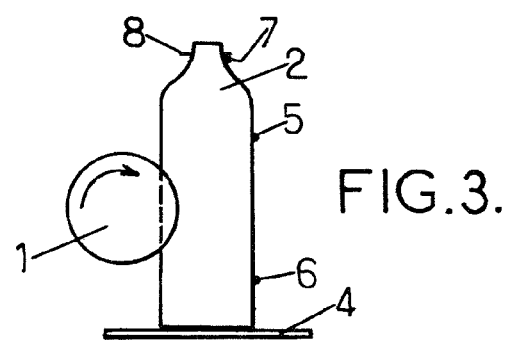
FIG. 3 is a schematic transverse sectional view of the feed screw device illustrated in FIG. 2.

The final pitch between two adjacent stations on the carousel is greater than the pitch of two containers fed by the feed device upstream of a variable pitch feed screw 1, as disclosed above in FIGS. 1 to 3, provided to be capable of receiving at its upstream end 1a the entities downstream of the device for feeding entities, not shown in the figures but of any type known per se.

Due to the increase in the pitch of the peripheral groove 3, in which the entities 2 are at least partially housed and received, the pitch between two successive entities 2 at the downstream end 1b of the screw 1 is increased.

Nevertheless, in order to limit the total length of the variable pitch screw, the pitch between two entities downstream of the feed screw 1 is at an intermediate pitch which is less than the final pitch between receiving stations of the receiving device. It is thus still necessary during a second step, to increase the pitch between two successive entities when passing from the intermediate pitch to the final pitch.

To achieve this, in order to stabilise the entities 2 at the outlet of the variable pitch screw 1, a transfer wheel 10 is provided comprising a plurality of transfer arms 12 capable of gripping the entities 2 downstream of the variable pitch screw 1.

The transfer arms 12 associated with the transfer wheel 10 are preferably all identical and uniformly distributed on the periphery of the transfer wheel 10, the pitch between the two transfer arms 12 being equal to the pitch of the entities 2 in the region of the downstream end 1b of the variable pitch screw 1, i.e. the pitch between two transfer arms 12 corresponds to an intermediate pitch between the initial pitch at the upstream end of the feed screw 1 and the final pitch in the region of the receiving device.

In order to allow the gripping of entities 2 displaced by the variable pitch screw 1, by the transfer arms 12 of the transfer wheel 10, it is provided that the transfer arms 12 have a circular displacement with the zone for gripping the entities 2 which is substantially tangential to the downstream zone for the longitudinal displacement of the entities 2 housed in the groove 3 of the variable pitch screw 1.

In order to allow the increase of pitch between two successive entities 2 between the transfer wheel 10 and the receiving device, i.e. the passage from an intermediate pitch to the final pitch, a wheel 14 for changing the pitch is provided, capable of gripping tangentially, by means of transfer arms 13 which are identical to the transfer arms 12 fixed to the transfer wheel 10, the entities 2 gripped by the transfer wheel 10 and to transfer them into receiving stations at a final pitch corresponding to the pitch of the two adjacent receiving stations on the carousel of the receiving or treatment device.

Figure 5:
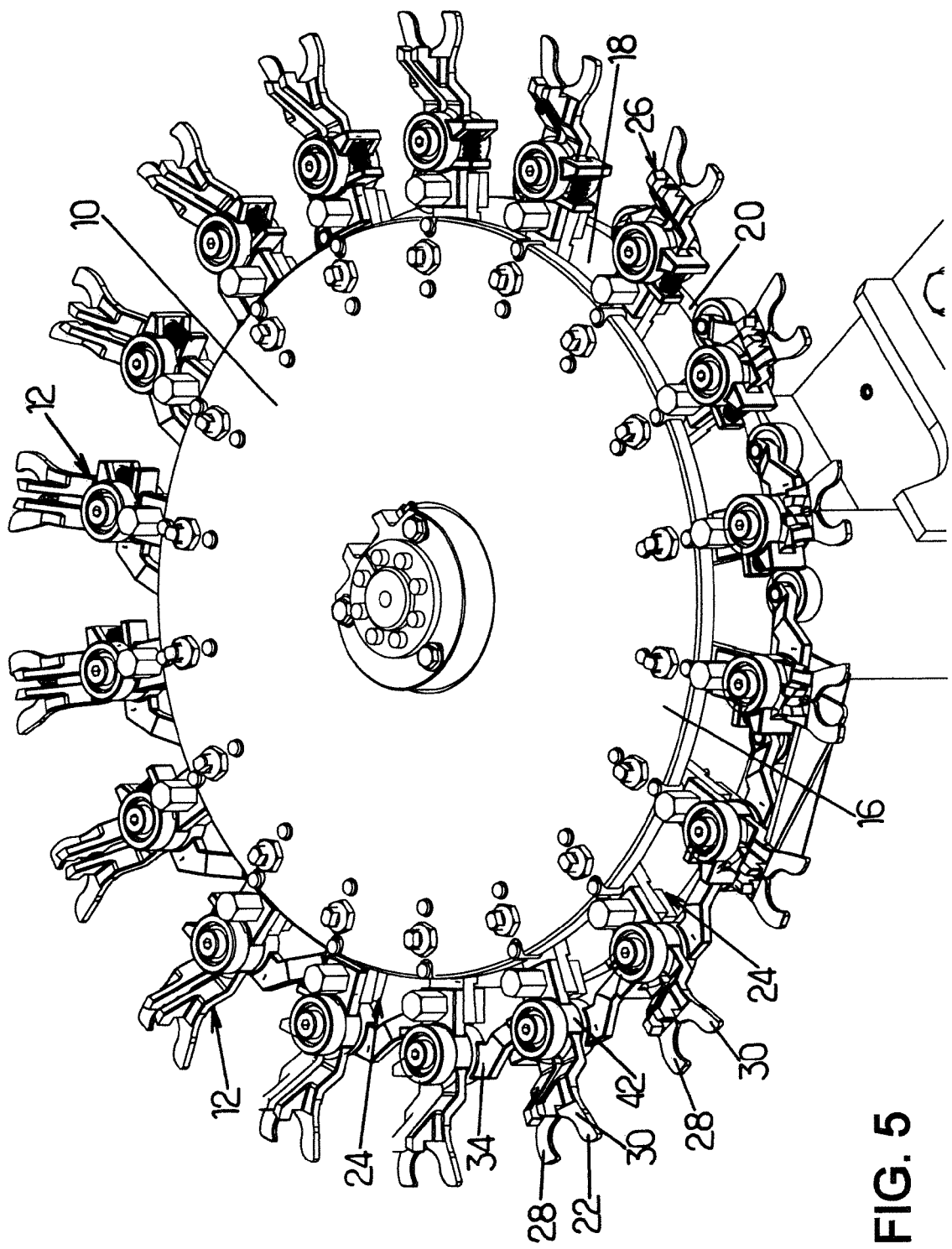
FIG. 5 is a perspective view of the transfer wheel belonging to the conveying system according to the invention.
Figure 6:
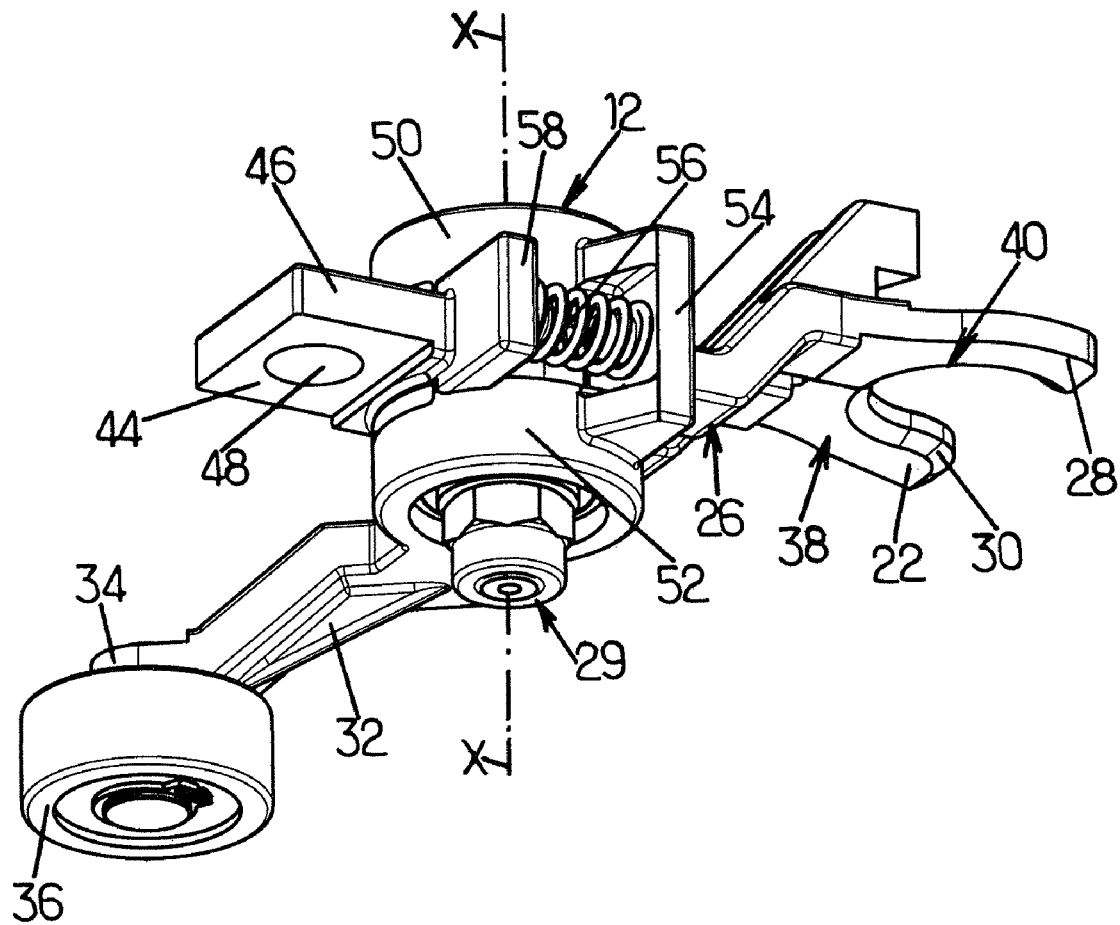
FIG. 6 is a detailed perspective view of the transfer arm fixed to the transfer wheel of FIG. 3.

The transfer wheel 10 on which a plurality of uniformly distributed transfer arms 12 are fixed radially on its periphery is illustrated in FIG. 5 according to a partial perspective view.

The transfer wheel 10 comprises a support plate 16 rotating about an axis of rotation on which the transfer arms 12 are fixed, in addition to a fixed base 18, of which the periphery defines a cam path 20, each transfer arm 12 comprising a gripping head 22 capable of gripping the container, the opening and the closing of the gripping head 22 being controlled by a cam system, i.e. by the cam path 20 provided on the periphery of the fixed base 18, namely on the lateral wall of the base 18, being in the preferred shape of a cylinder.

The transfer arms 12 are radially fixed to the rotating plate 16 of the transfer wheel 10 using removable fixing means 24, as disclosed in more detail below.

The transfer arms 12 fixed to the transfer wheel 10 may not be removed radially during the rotation of the transfer wheel 10 and during the operation of gripping the containers downstream of the variable pitch screw 1.

According to the preferred embodiment, the fixed base 18 is provided below the rotating plate 16, the axes of rotation of the wheels 10, 14 being provided, for convenience, to be vertical and the concepts "above" and "below" referring back to this frame of reference.

The gripping head 22 of the transfer arm 12 is in the form of a gripping clamp 26 with two gripping arms 28, 30, one of the two arms 28 of the clamp 26 being connected by means 29 for axial pivoting about an axis X-X to a cam follower arm 32 having, at its free end 34, a freely rotating roller 36, capable of bearing against the cam path 20 of the fixed base 18, by following the cam path.

More specifically, the transfer arm 12 is in two parts, one fixed part 38 comprising the gripping arm 30 which is fixed and one pivoting part 40 comprising the gripping arm 28 which is capable of being pivoted about the pivot axis X-X of the axial pivoting means 29.

The fixed gripping arm 30 is attached to a circular section 42, a tab 44 being fixed to the circular section 42 diametrically opposed to the gripping arms 28, 30, the tab 44 being substantially planar, provided transversely relative to the pivot axis X-X of the axial pivoting means 29, and in the form of a rectangular element 46 with a central orifice 48.

The pivoting part 40 consists of the pivoting gripping arm 28 connected to two upper and lower circular parallel sections 50, 52, the circular fixed section 42 being capable of being inserted by means of complementarity between the two upper and lower circular parallel sections 50, 52, so as to define a cylindrical assembly.

The arm 32, having the roller 36 for controlling the opening and closing of the gripping clamp 26 is fixed to the lower circular section 52. Nevertheless, the principle of controlling the opening and closing of the gripping clamp may also apply if the arm 32 is fixed to the upper circular section 50.

A bridge 54 forming a vertical wall is provided connecting the two upper and lower sections 50, 52 and forming an abutment stop for the elastic return means 56 between said bridge 54 forming the vertical wall and a vertical wall 58 connected to the tab 44, the opening of the gripping clamp 26 being carried out by exerting a compressive force of the elastic return means 56, by bringing the bridge 54 towards the vertical wall 58, the upper and lower sections 50, 52 being provided to pivot about the vertical pivot axis X-X.

Figure 7:
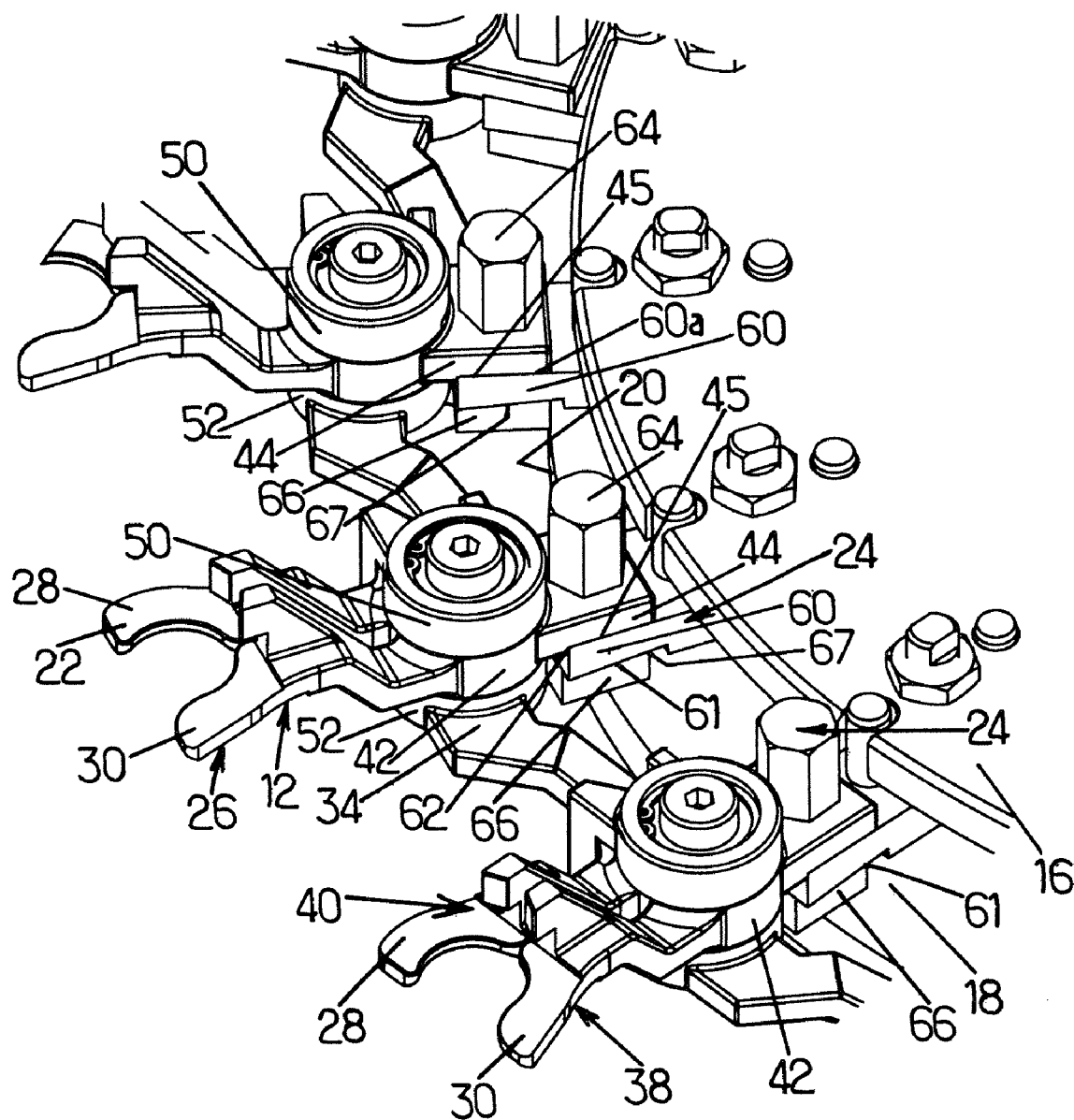
FIG. 7 is an enlarged perspective view of the removable rapid fixing means of the transfer arm on the transfer wheel.

A perspective view of the removable fixing means 24 of the transfer arm 12 on the rotating plate 16 is illustrated in FIG. 7.

A rectangular small plate 60 is provided fixed to the lower wall of the rotating plate 16 by any fixing means so that one part of this small plate 60 forms a rectangular extension projecting from the peripheral edge of the rotating support plate 16.

The tab 44 of the transfer arm 12 is capable of bearing against the upper face 60a of the projecting small plate 60, the tab 44 being blocked radially by the presence of a stop 62 on the lower face 45 of the tab 44 in the form of a material recess.

The small plate 60 also has a central recess (not visible in the figures), preferably thus defining a projecting end with two arms, so that once the tab 44 is pressed down on the upper face 60a of the small plate 60, the central orifice of the tab 44 coincides with the recess of the small plate 60 so as to allow the passage of a screw 64 which is blocked and held in position by means of a nut 66 pressed down by screwing onto the lower face 61 of the projecting small plate 60. The removable fixing means 24 of the transfer arm 12 on the transfer wheel 10 thus preferably comprise screwing means in the form of a screw 64 and nut 66 assembly.

Preferably, the nut 66 has an angled upper face 67 of complementary shape to the lower face 61 of the small plate 60 which is also angled in the opposite direction. In this manner, improved tangential blocking of the transfer arm 12 is obtained.

Thus, if the user desires to replace a transfer arm 12 by another, only the screw 64 and the nut 66 have to be unscrewed. Due to the presence of the recess in the small plate 60, the user does not have to completely unscrew the nut 66 on the screw 64 to remove the transfer arm 12.

Figure 8:
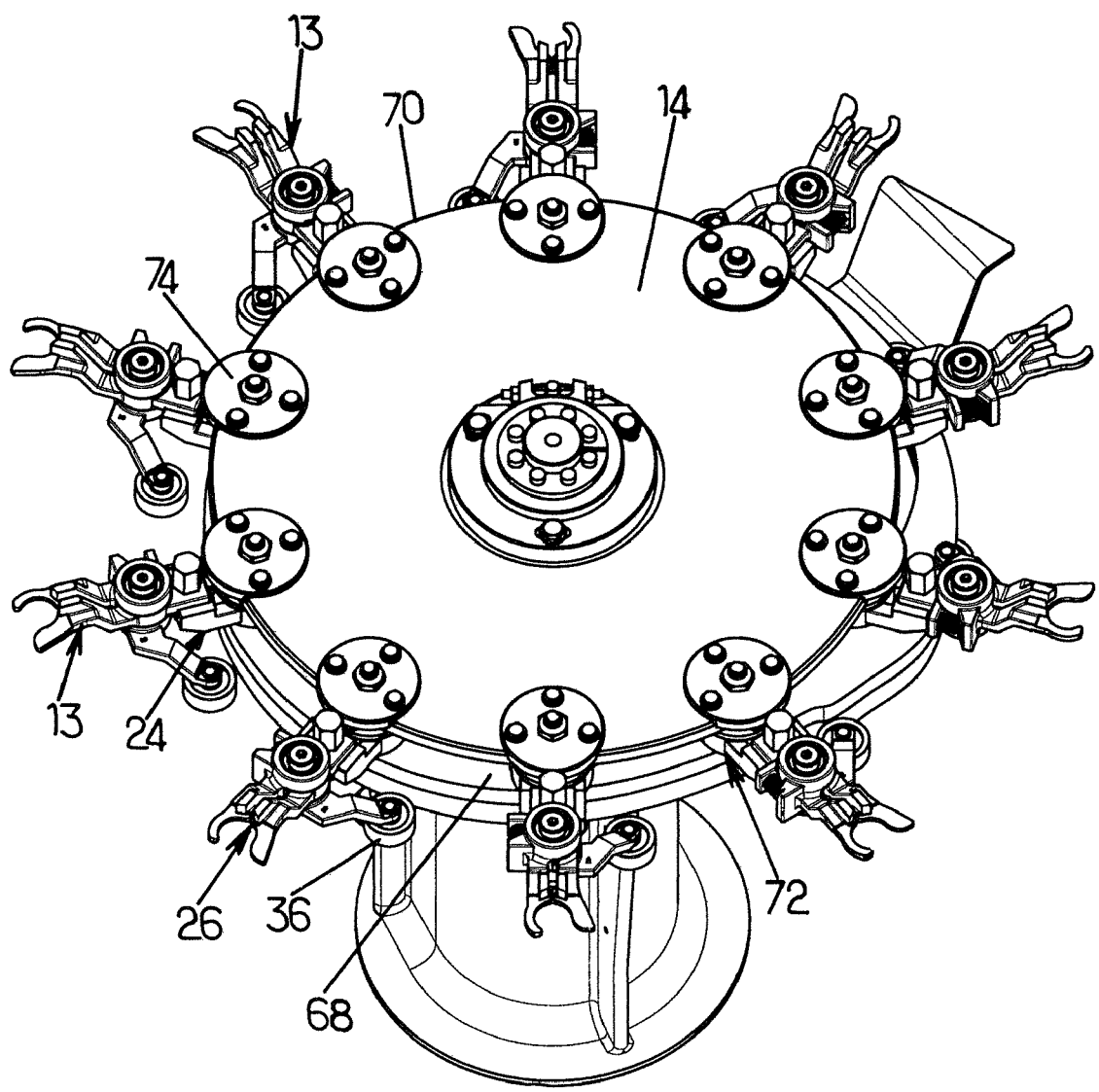
FIG. 8 is a perspective view of the wheel for changing the pitch with the transfer arm.
Figure 9:
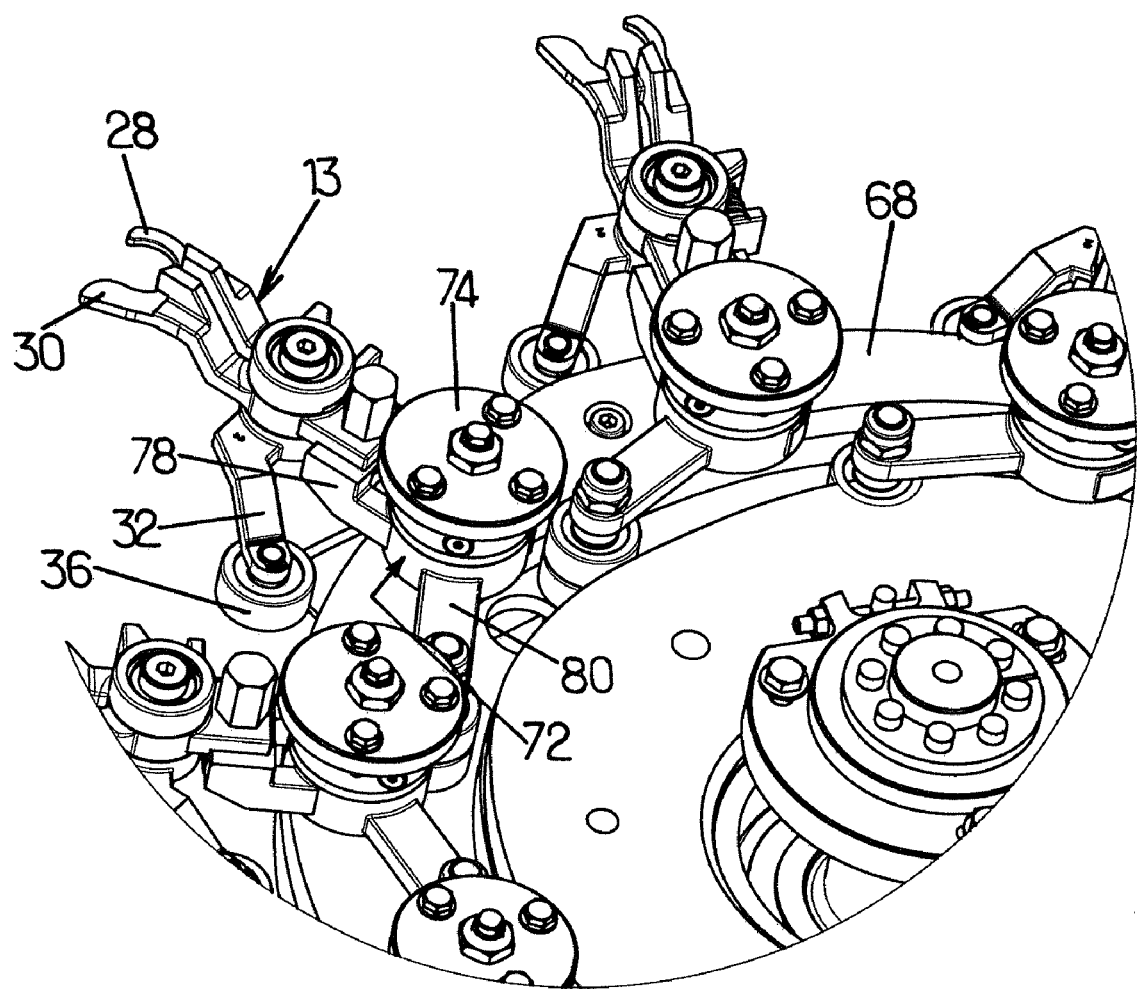
FIG. 9 is an enlarged perspective view of the means for pivoting the transfer arms fixed to the wheel for changing the pitch.
Figure 10:
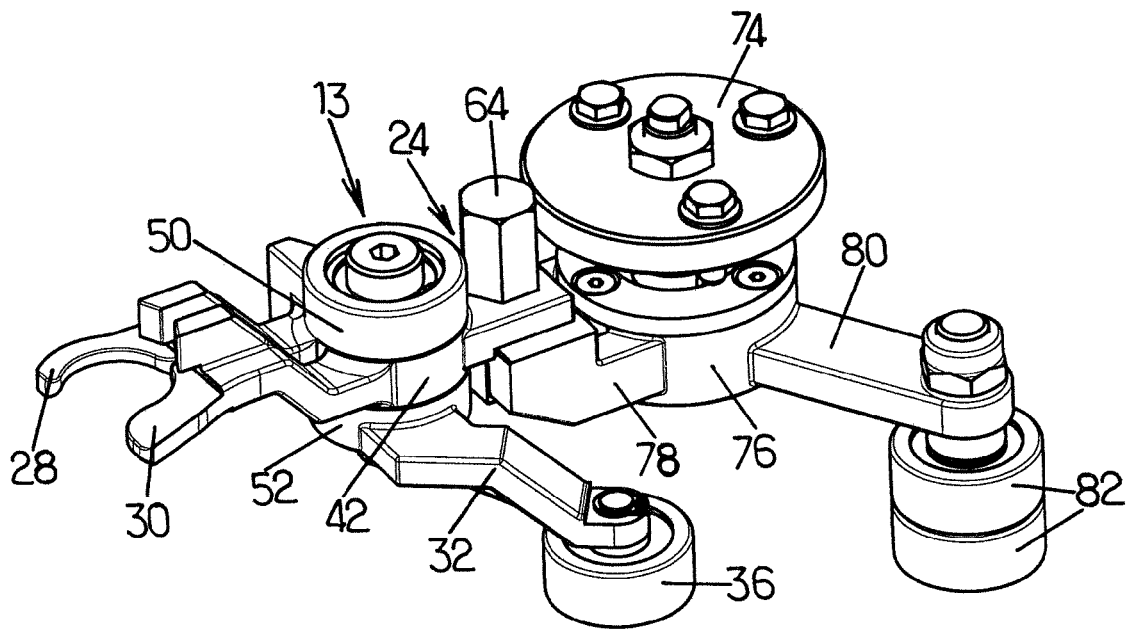
FIGS. 10 and 11 are respectively two upper and lower enlarged detailed perspective views of the transfer arm associated with the means for pivoting the arm on the wheel for changing the pitch.
Figure 11:
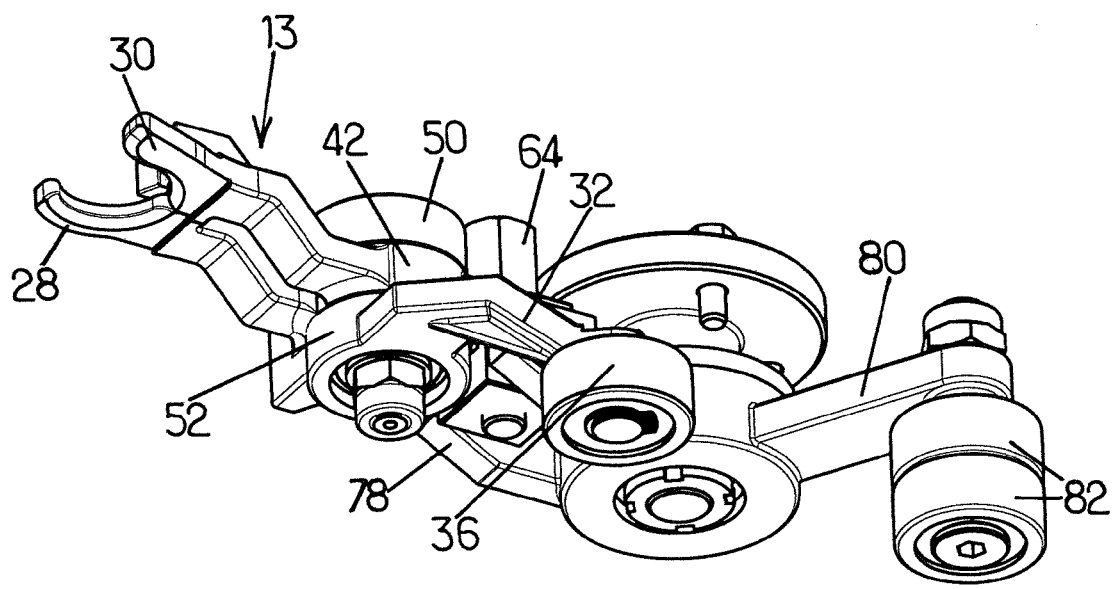

FIG. 8 is a perspective view of the wheel 14 for changing the pitch, comprising a plurality of transfer arms 13 uniformly distributed on its periphery.

The wheel 14 for changing the pitch comprises a fixed base 68 and a rotating support plate 70.

The transfer arm 13 is of the same type as the transfer arm 12 as disclosed above with a roller 36 capable of bearing against the cam path defined by the peripheral edge of the fixed base 68 so as to control the opening and closing of the gripping head of the gripping clamp 26.

The fixing means 72 of the transfer arm 13 on the rotating support plate 70 of the wheel 14 for changing the pitch comprise an upper plate 74 which is fixed or directly incorporated into the rotating support plate 70, in addition to a lower section 76 mounted freely pivoting on the upper plate 74, the lower section 76 comprising a fixing arm 78 projecting from the fixed base 68 and on the end of which is fixed the transfer arm 13 by means of the tab 44 and removable fixing means 24 as described above.

The lower section 76 also has a cam follower arm 80 having at its end a pair of rollers 82 arranged one above the other and capable of following a cam path and a counter cam path formed in the fixed base 68 so as to define the pivoting of the transfer arm 13 and thus to allow the increase in pitch between two entities successively gripped by the transfer arms 13 of the wheel 14 for changing the pitch, and thus resulting in the passage from the intermediate pitch to the final pitch.

I claim:

1. Method for changing the pitch between discrete entities conveyed in succession between a device for feeding said entities at an initial spacing pitch provided between two entities fed in succession and a device for receiving said entities at a final pitch substantially greater than the initial pitch, wherein the method comprises the steps of:

transporting the discrete entities by a variable pitch feed screw device configured to receive said entities downstream of said device for feeding said entities, said variable pitch feed screw device comprising a screw, wherein the screw comprises a groove in which said entities are capable of being housed and displaced, so that the pitch between two entities received by said screw is increased downstream of said screw as far as an intermediate pitch;

transferring and gripping the entities at an intermediate pitch by a wheel for changing the pitch, configured to transfer said entities into said receiving device at said final pitch.

2. An installation for changing the pitch between discrete entities conveyed in succession between a device for feeding said entities at an initial spacing pitch provided between two entities fed in succession and a device for receiving said entities at a final pitch substantially greater than the initial pitch, wherein it comprises:

a feed screw device with a variable pitch between said initial pitch and an intermediate pitch configured to receive in a peripheral groove said entities downstream of said feed device, in which said entities are at least partially housed;

a wheel for changing the pitch capable of gripping, by means of transfer arms, said entities gripped at said intermediate pitch, and transferring said entities into said receiving stations of the receiving device at said final pitch.

3. Installation for changing the pitch according to claim 2, wherein it comprises a transfer wheel comprising a plurality of transfer arms configured to grip, at said intermediate pitch, said entities in the region of the end downstream of said feed screw.

4. Installation for changing the pitch according to claim 2, wherein said transfer arms of said transfer wheel and said wheel for changing the pitch each comprise a gripping head in the form of a gripping clamp with two arms, with cam-controlled opening.

5. Installation for changing the pitch according to claim 2, wherein said transfer wheel and said wheel for changing the pitch comprise a rotating support plate on which the transfer arms are fixed by removable fixing means.

6. Installation according to claim 5, wherein said removable fixing means comprise a screw nut assembly.

7. Installation according to claim 6, wherein the screw is capable of being inserted into a tab incorporated in the transfer arm.

8. An apparatus that changes a pitch between discrete entities conveyed in succession between a first device and a second device, comprising:

a feed screw having a first end and a second end and comprising a peripheral groove, wherein the entities are received at the first end and wherein the feed screw changes the pitch between entities from an initial pitch to an intermediate pitch as the entities travel from the first end to the second end; and a wheel configured to receive the entities from the second end of the feed screw, the wheel being further configured to change the pitch between the entities from the intermediate pitch to a final pitch and to transfer the entities to the second device at the final pitch.

9. A method for changing a pitch between discrete entities conveyed in succession between a first device and a second device, comprising:

receiving the entities at a feed screw, the feed screw having a first end and a second end, wherein the feed screw changes the pitch between entities from an initial pitch to an intermediate pitch as the entities travel from the first end to the second end;

transferring the entities from the second end of the feed screw to a wheel, the wheel being configured to change the pitch between the entities from the intermediate pitch to a final pitch; and transferring the entities from the wheel to the second device at the final pitch.

* * * * *